March 22, 1960 W. D. WESTON ET AL 2,930,016
HYGROMETER OF HIGH SENSITIVITY
Filed Dec. 17, 1956
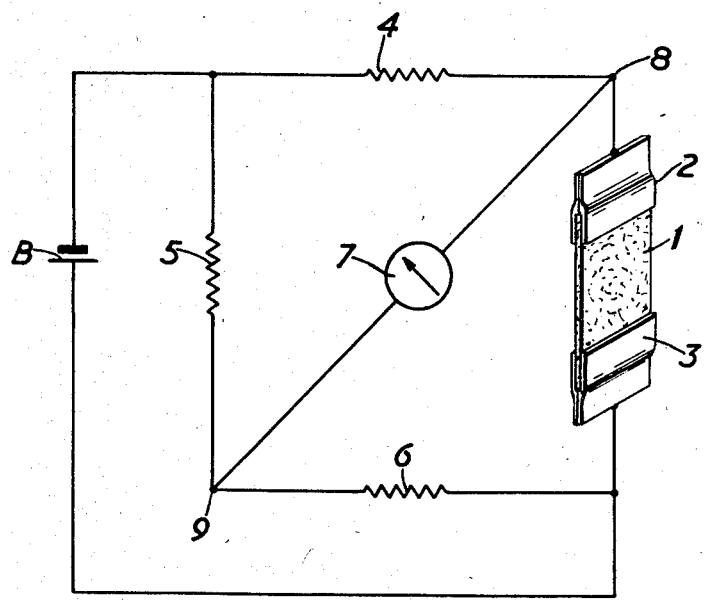

2,930,016
HYGROMETER OF HIGH SENSITIVITY

William D. Weston, Blisworth, and John M. Herbert, Horton, England, assignors to The Plessey Company Limited, Ilford, England, a British company Application December 17, 1956, Serial No. 628,936

Claims priority, application Great Britain December 12, 1955

2 Claims. (Cl. 338—35)

This invention relates to the measurement of water or other vapour by causing the vapour to affect the electrical capacitance and/or resistance of a material.

The invention is based on the fact that if a sufficient quantity of finely divided carbon (or other conductive material) is dispersed in an insulating material which can absorb moisture from the air, with a consequent change in dimensions, the resulting body will be electrically conductive and its ohmic resistance will be a function of the humidity of the atmosphere to which it is exposed.

It is a feature of this invention to make such a conductive body in a highly porous form with a maximum area per unit volume, so that the exchange of moisture between the body and the air may take place very rapidly. By this means an improved humidity-responsive element, the resistance value of which can be used as a measure of atmospheric humidity, and which responds rapidly to changes in humidity, can be made.

The invention is preferably carried out by dispersing sufficient carbon in a polymeric organic body to give a final resistance value of the required order, and then applying one of the known techniques for forming a solid foam from the material. Thin sections are then cut from the foam using a microtome and employing the technique usual for cutting biological sections for microscopic examination. The sections, which preferably are .5 to 50μ thick, are then mounted between suitable metal electrodes to form resistive elements.

*Example I.*—Alkaline xanthated cellulose derived from 100 parts by weight of dry raw cellulose was mixed with 10 parts of finely chopped hemp fibre, 55 parts gas black, 500 parts hydrated sodium sulphate (ground to pass through 50 mesh per inch screen) and sufficient saturated sodium sulphate solution to render the mixture mouldable. The mixture was packed into perforated moulds and heated in a sodium sulphate solution to decompose the xanthate and leach out most of the sodium sulphate. The crude sponge thus obtained was then treated with acid, the residual sodium sulphate was washed out with water and the remaining sponge dried. The dried sponge was immersed in molten paraffin wax at 80° C. and cooled to room temperature. The waxed block was suitably shaped, clamped on a microtome and 0.002″ slices were cut from it. The slices were washed in xylene to remove the wax and then successively with ether, alcohol and water. The cleaned slices were held between two brass clamps about 1″ wide with a gap of ⅛″ between them. The resistance between the clamps was about 0.5 megohm at zero humidity increasing to 1.5 megohms at 100% relative humidity. The change in resistance was found to be substantially complete within 15 seconds of changing the humidity.

*Example II.*—Xanthated cellulose derived from 100 parts by weight of dry raw cellulose was mixed with 25 parts by weight of undissolved cellulose fibres and 60 parts of gas black.

To this mixture was added a quantity of hydrated sodium sulphate having a volume approximately 6 times that of the mixture. The sodium sulphate was comprised of 1 part ground so that none was retained on a 20 mesh screen and none passed through a 44 mesh screeen and 4 parts ground so that none was retained on a 44 mesh screen and none passed through a 60 mesh screen.

The mixture was packed into perforated metal moulds and heated in a near saturated solution of sodium sulphate to decompose and xanthate and leach out most of the sodium sulphate. The residual sodium sulphate was removed by washing in several changes of water and the remaining sponge dried.

The dried sponge was immersed in molten paraffin wax at 60° C., de-aired and cooled to room temperature. The waxed block was suitably shaped, clamped on a microtome and 0.003″ slices were cut from it. The slices were washed in xylene to remove the wax and then successively with ether, alcohol and water. The cleaned slices were held between two brass clamps about 1″ wide with a gap of ⅛″ between them. With a typical slice at +20° C. the resistance between the clamps at different values of relative humidity is given in the table.

Changes in resistance were found to be substantially complete within 15 seconds of changing the humidity.

| Relative humidity, percent: | Resistance ohms × $10^5$ |
|---|---|
| 0 | 1.95 |
| 10 | 2.08 |
| 20 | 2.25 |
| 30 | 2.40 |
| 40 | 2.58 |
| 50 | 2.78 |
| 60 | 3.05 |
| 70 | 3.42 |
| 80 | 4.05 |
| 90 | 5.26 |
| 100 | 7.40 |

One form of moisture measuring apparatus intended to measure the humidity of air is schematically illustrated in the accompanying drawing. The moisture sensitive porous element according to the invention is indicated at 1. It is in the form of a thin slice shown considerably enlarged, and is held along two opposite edges by brass clamps 2 and 3. Only part of the clamps has been shown assuming that, as the above indicated, the width of the clamps is about 8 times their distance. In order to utilise the variation of resistance of the element 1 according to the humidity of the air for an indication, the element 1 is arranged in a bridge circuit, in which it is connected across a constant voltage from a source B, in series with a fixed resistor 4; a second branch of the bridge comprising fixed resistors 5 aand 6 is connected across the same voltage in parallel to the elements 1 and 4. A voltmeter 7 of adequate sensitivity and high internal resistance is connected between the junction point 8 of elements 1 and 4 and the junction point 9 of elements 5 and 6. It should be understood that this arrangement has only been described by way of an example and that many other circuit arrangements by which the variation in the resistance of element 1 can be utilised for obtaining a visual indication, or a control, corresponding to the humidity of the atmosphere in which the element 1 is placed, can be obtained, are readily available to those skilled in the art.

What we claim is:

1. A humidity sensitive element comprising a self-supporting unit having a thickness within the range 0.5 micron to 50 microns, the unit consisting of a moisture absorbent electrically insulating solid foamed xanthated cellulose and a dispersion in the foamed structure of elemental carbon particles.

2. A humidity sensitive element comprising a self-supporting unit consisting of elemental carbon particles dispersed in an electrically insulating solid foamed xanthated cellulose, the thickness of the self-supporting unit being within the range of 2.5 and 50 microns.

References Cited in the file of this patent

UNITED STATES PATENTS

| | | |
|---|---|---|
| 1,909,629 | Pfannenstiel et al. | May 16, 1933 |
| 2,047,638 | Kott | July 14, 1936 |
| 2,133,805 | Brown | Oct. 18, 1938 |
| 2,234,858 | Brown et al. | Mar. 11, 1941 |
| 2,252,277 | Tate | Aug. 12, 1941 |
| 2,256,642 | Gaut et al. | Sept. 23, 1941 |
| 2,358,406 | Lichtgarn | Sept. 13, 1944 |
| 2,367,561 | Bouyoucos | Jan. 16, 1945 |
| 2,490,178 | Vander Kroon | Dec. 6, 1949 |
| 2,613,302 | Gurewitsch | Oct. 7, 1952 |
| 2,722,586 | Stearns et al. | Nov. 1, 1955 |
| 2,806,991 | White | Sept. 17, 1957 |
| 2,904,765 | Seehof et al. | Sept. 15, 1959 |

OTHER REFERENCES

"Microscopical Section Cutting" (March), second edition, published by J and A Churchill (London), 1882 (pages 34, 35 and 36 relied upon).